R. J. POSTON.
COTTON CHOPPER.
APPLICATION FILED JUNE 5, 1917.
1,248,160.
Patented Nov. 27, 1917.
3 SHEETS—SHEET 3.
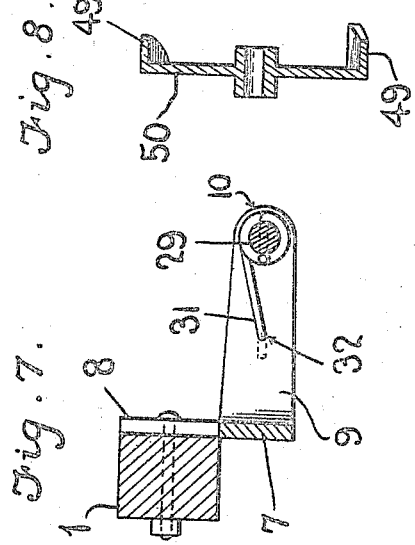
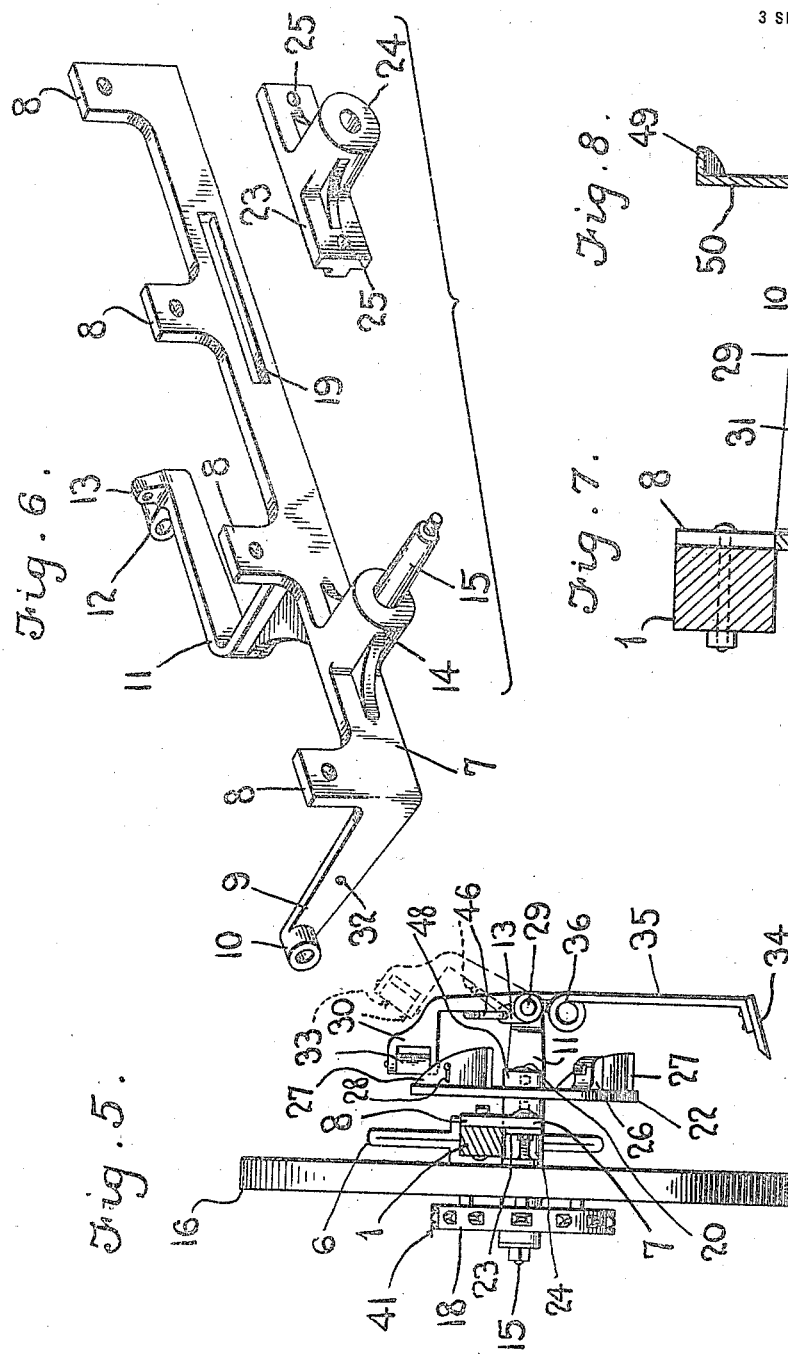
Inventor
Robert J. Poston
By
[signature], Attorneys.

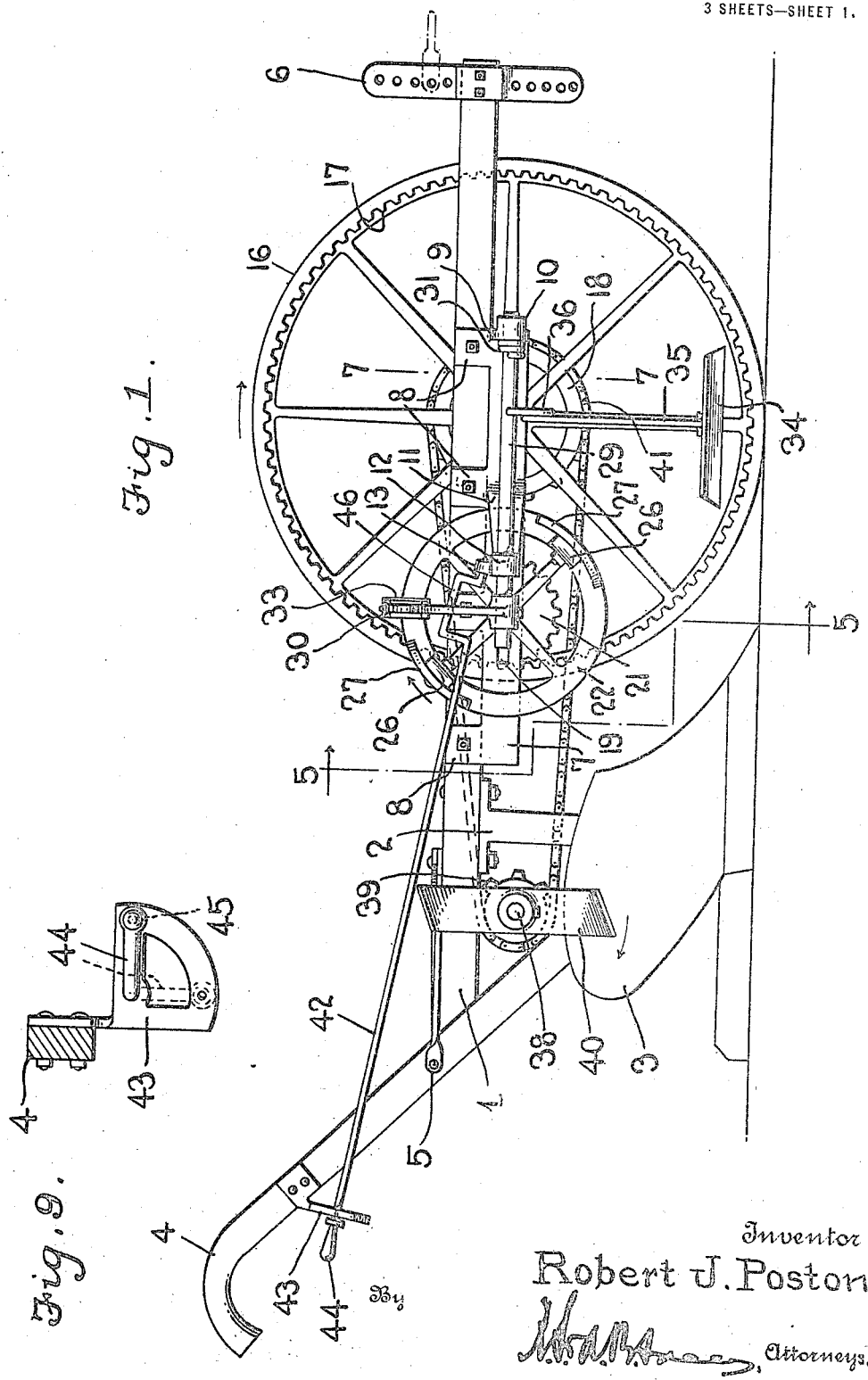

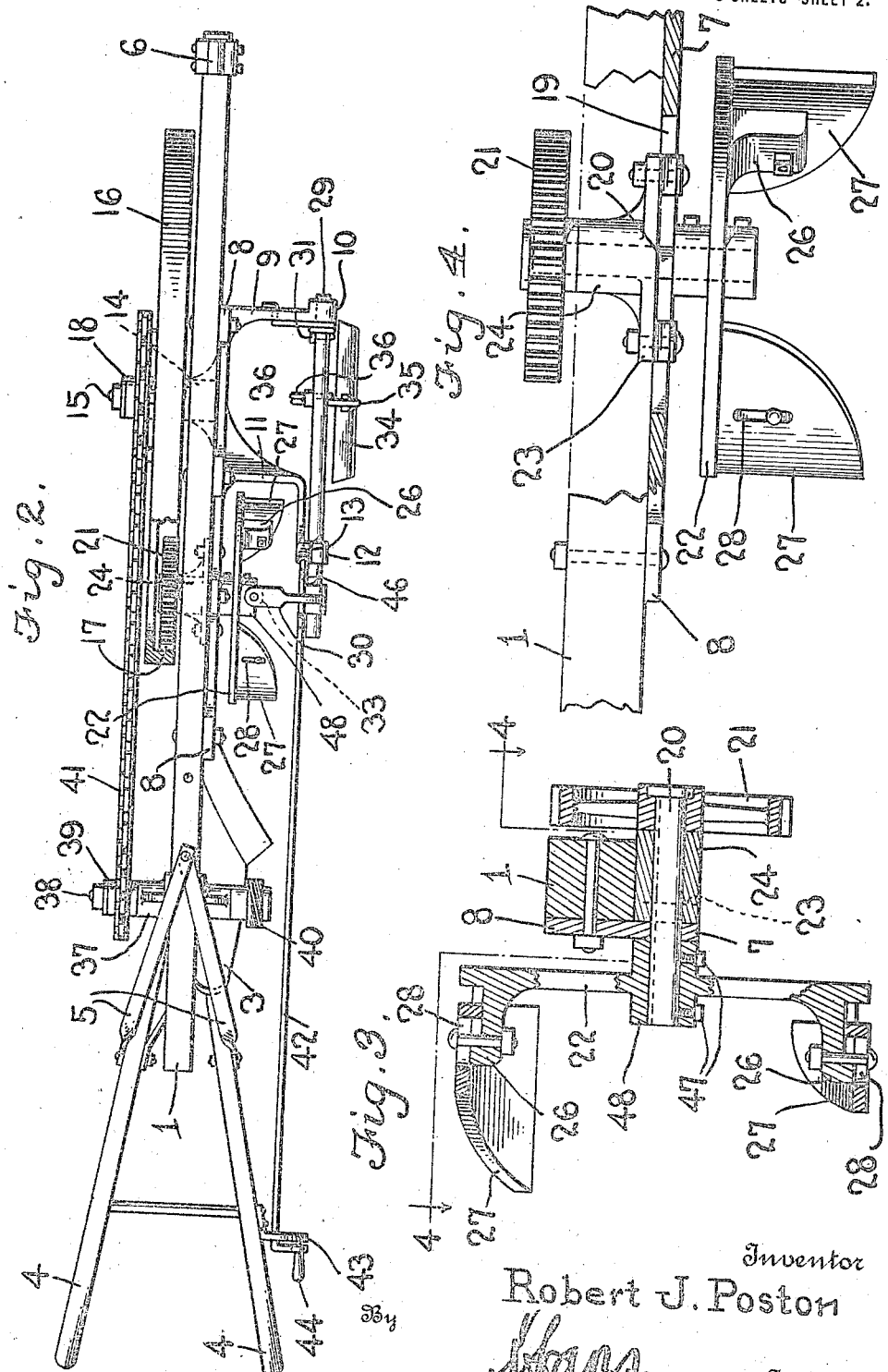

UNITED STATES PATENT OFFICE.

ROBERT J. POSTON, OF GEORGETOWN, SOUTH CAROLINA.

COTTON-CHOPPER.

1,248,160.   Specification of Letters Patent.   Patented Nov. 27, 1917.

Application filed June 5, 1917. Serial No. 172,975.

*To all whom it may concern:*

Be it known that I, ROBERT J. POSTON, a citizen of the United States, residing at Georgetown, in the county of Georgetown and State of South Carolina, have invented certain new and useful Improvements in Cotton-Choppers, of which the following is a specification.

The object of this invention is to provide means whereby as a plow is drawn along a field between two rows of plants to throw dirt up to and around the stalks, the plants may be thinned by having plants at regular intervals automatically cut down, a further object of the invention being to provide means whereby as a cultivator plow is drawn over a field alongside of a row of plants, any weeds that may be present in the dirt turned over by the plow will be cut up and thereby destroyed. A still further object of the invention is to provide a chopper attachment for plows which may be readily removed when it is desired to use the plow without cutting out plants from a row. Other incidental objects of the invention will appear as the description of the same proceeds.

The invention is illustrated in the accompanying drawings, in which—

Figure 1 is a side elevation of a plow having my improved chopping and cutting attachments applied thereto;

Fig. 2 is a plan view of the same;

Fig. 3 is a section through the cam for operating the chopper;

Fig. 4 is a plan view of the said cam and its driving mechanism with parts in section on the line 4—4 of Fig. 3;

Fig. 5 is a transverse section on the line 5—5 of Fig. 1;

Fig. 6 is a detail perspective view of the frame for supporting the chopper;

Fig. 7 is a transverse section on the line 7—7 of Fig. 1;

Fig. 8 is a sectional view showing a non-adjustable cam;

Fig. 9 is a detail end elevation of the rear support for the chopper controlling lever.

In the accompanying drawings, the reference numeral 1 indicates a plow beam to which, near the rear end thereof, is secured a standard 2 carrying a plow 3, handles 4 of the usual type being connected with the plow and the standard and also connected with the beam by braces 5. A vertically adjustable draft bar 6 is provided at the front end of the beam so that the draft may be regulated so as to subject the draft animals to the least possible strain.

To one side of the plow beam 1, I secure a frame consisting of a bar 7 having perforated lugs or ears 8 rising from its upper edge to receive fastening bolts or similar devices which are inserted through the beam to rigidly secure the frame thereto. A laterally extending arm 9 is provided at the front end of this beam or bar 7 and at the free end of said arm is a bearing 10. Near the front end of the bar or beam 7, a bracket 11 extends laterally therefrom and has its outer portion carried rearwardly parallel with the bar and has its extremity equipped with bearings 12 and 13, the purpose of which will presently appear. A bearing 14 is formed upon the bar 7 between the arms or brackets 9 and 11 and this bearing extends under the beam 1, as indicated by dotted lines in Fig. 2. An axle 15 extends through the bearing 14 and may be rigidly secured therein in any desired manner or may be formed integral therewith. Upon the axle, adjacent the beam, I secure the ground wheel 16 having an internal gear 17 formed upon its inner periphery and beyond the said ground wheel 16 a sprocket wheel 18 is mounted upon the axle, said sprocket wheel being secured to the ground wheel 16 in any desired manner so as to rotate with the same. In rear of the bracket or arm 11, the bar 7 is constructed with a longitudinal slot 19 through which may pass a shaft 20 carrying a pinion 21 on one end and on the other end carrying the cam plate or head 22. The pinion 21 meshes with and receives motion from the internal gear 17 and the cam head 22 will, of course, rotate with the shaft 20. The shaft 20 is carried by a bearing block or bar 23 having a sleeve or bearing 24 to support the shaft and provided with openings 25 through which and the slot 19 fastening bolts may be inserted to secure the bar 23 to the bar 7 and permit its adjustment longitudinally of said bar. It will be understood that the speed of rotation of the shaft 20 relative to the ground wheel may be varied by substituting for the gear 21 a gear of different diameter and the interchanging of gears will require the shaft 20 to be adjusted longitudinally of the plow beam so as to permit the gears to mesh with the internal gear. This necessity is met by providing the slot 19 and adjusting the bearing block or bar 23 to the proper point along said slot. The cam head 22 may be a disk or a plurality of spokes but, in either event, it will be provided at intervals with lugs or plates 26 to the sides of which the driving cams 27 are secured. These driving cams 27 will preferably be separate plates constructed with slots 28 through which the bolts to secure the cams to the cam heads are inserted, the slotted construction permitting the cam plates to be moved longitudinally of the shaft 20 so as to vary the throw of the chopper as may be deemed advantageous. The stroke of the chopper may be further regulated by having a plurality of cam plates having cam edges of different lengths and inclinations and using the said plates interchangeably.

In the bearings 10 and 12, I mount the chopper shaft 29, the rear end of said shaft projecting through and rearwardly beyond the bearing 12. A tappet 30 is secured upon the rear extremity of the chopper shaft and the free end of this tappet is held normally in the path of the cams 27 by a spring 31 wrapped around and having one end secured to the chopper shaft while its opposite end is secured to the bracket 9, an opening 32 being provided in said bracket to receive the end of the spring. The free extremity of the tappet 30 is equipped with a roller 33 so as to reduce the frictional wear between the tappet and the cam and the spring 31 is so arranged that it will hold the tappet in such position that the roller 33 will tend constantly to bear upon the edge of the cam plates 27. The chopper plate 34 is secured to the lower end of a standard or stem 35 which has its upper end secured to the chopper shaft, the connection preferably being a spring 36 whereby if the blade should strike a rock or other unyielding obstruction it may yield to the same and thereby avoid breakage.

Upon the beam 1, near the rear end of the same, I support a bearing 37 in which is journaled a shaft 38 carrying a sprocket 39 on one end and on its opposite end carrying a knife 40 which is disposed just above the moldboard of the plow. The sprocket 39 is operatively connected by a chain 41 with the sprocket wheel 18 so that the motion of the ground wheel will be transmitted through the described mechanism to the knife 40 which will be rapidly rotated and pass through the dirt turned over by the moldboard so as to cut up and destroy weeds and other obnoxious growths contained therein.

It will be readily understood from the foregoing description, taken in connection with the accompanying drawings, that as the plow is drawn over a field alongside of a row of plants it will turn up the dirt from the furrow and throw the same onto the hills. The ground wheels 16 will, of course, rest directly upon the ground and will, therefore, rotate as the machine is drawn along, the rotation of the said wheels being transmitted directly to the cam shaft 20 and through the sprocket gearing described to the cutter shaft 38. As the cam shaft 20 is rotated, the cam head 22 will be likewise rotated and the cam plates successively brought against the tappet to force the same outward against the tension of the spring 31. As soon as the high part of the cam has cleared the tappet, the spring will force the tappet inwardly into position to be engaged by the next succeeding cam plate and this operation will be repeated as long as the machine is in motion. The chopper shaft 29 will obviously be rocked and the blade 34 at regular intervals will be caused to swing across the row of plants and against the plants in its path so as to cut them from the row and leave the growing plants standing at proper intervals. Of course, if the machine should be drawn backwardly, the ground wheel will be rotated in the reverse direction and would tend to move the blunt ends of the cam plates against the tappet. The engagement of the blunt ends of the cam plates with the tappet will, of course, stop the operation of the machine, and to avoid this condition, I provide the controlling rod 42 which has its front end journaled in the bearing 13 and has its rear end journaled in a bracket 43 secured upon one of the handles 4. The rear end of the rod 42 is equipped with a handle 44 and this handle carries a locking pin, indicated at 45, which is adapted to engage a suitable socket in the bracket and thereby hold the controlling rod in any position in which it may be set. Near its front end, the controlling rod is constructed with a crank 46 so located as to tend to bear against the tappet 30 so that if a quarter turn be given the controlling rod 42, the crank will be swung downwardly and outwardly and will throw the tappet out of the path of the cam plates, as indicated by dotted lines in Fig. 5. The plow can then be drawn backwardly without damage to any of the parts. This controlling rod will also be found useful in the event that it is desired to hold the chopper in an inoperative position while the plow is being driven forward and thereby permit some desirable plants to stand at the expense of having the plants at irregular intervals.

The cam head 22 is secured to the cam shaft 20 by set screws 47 inserted through the hub or sleeve 48 at the center of the cam head, as clearly shown in Fig. 3. If, therefore, these set screws be loosened, the cam head may be readily slipped off the end of the cam shaft. Such removal of the cam will render the chopper inoperative in the event that it is desired to use the plow without the chopper and the chopper may be entirely disconnected and removed from the plow by first drawing the controlling rod 42 rearwardly so that its front end will leave the bearing 13. The bar 7 with all the parts mounted thereon may then be removed from the plow beam by withdrawing the fastening bolts or similar devices inserted through the lugs or ears 8. The plow can then be used in the usual manner and will have the additional advantage to be derived from the employment of the rotary cutter 40.

While I prefer to make the operating cam adjustable so as to vary the length of the chopper stroke, as well as time the same, it is to be understood that I do not limit myself to an adjustable cam and in Fig. 8 I have illustrated a cam in which the cam flanges or tappet-engaging surfaces 49 are formed integral with the cam head 50. Other minor changes in the details of the construction may be made without involving any departure from the principles of my invention as the same is defined in the following claims.

My improved plow attachments are very simple in the construction and arrangement of their parts and will be found highly efficient for the purposes for which they are designed.

Having thus described the invention, what is claimed as new is:

1. In an apparatus for the purpose set forth, the combination of a supporting frame, a chopper shaft journaled thereon, a chopper carried by said shaft, a cam mounted upon the frame, means for actuating the cam, a tappet extending from the chopper shaft and having its free end adapted to be engaged by the cam, a spring secured to the support and the shaft and tending to hold the tappet in the path of the cam, and a controlling rod mounted upon the frame and having a crank bearing against the tappet whereby rocking of said rod will hold the tappet out of the path of the cam.

2. The combination with a plow beam, of a frame secured against a side of the beam and having laterally projecting bearing arms, a chopper shaft journaled in said arms, a chopper carried by said shaft, a tappet on the rear end of the shaft, a bearing bracket secured to the frame and extending through the plow beam, a shaft journaled in and extending through said bracket, a cam on one end of said shaft to engage the tappet, and means acting on the opposite end of the shaft to rotate the same.

In testimony whereof I affix my signature.

ROBERT J. POSTON. [L. S.]

Copies of this patent may be obtained for five cents each, by addressing the "Commissioner of Patents, Washington, D. C."